United States Patent Office 3,369,850
Patented Feb. 20, 1968

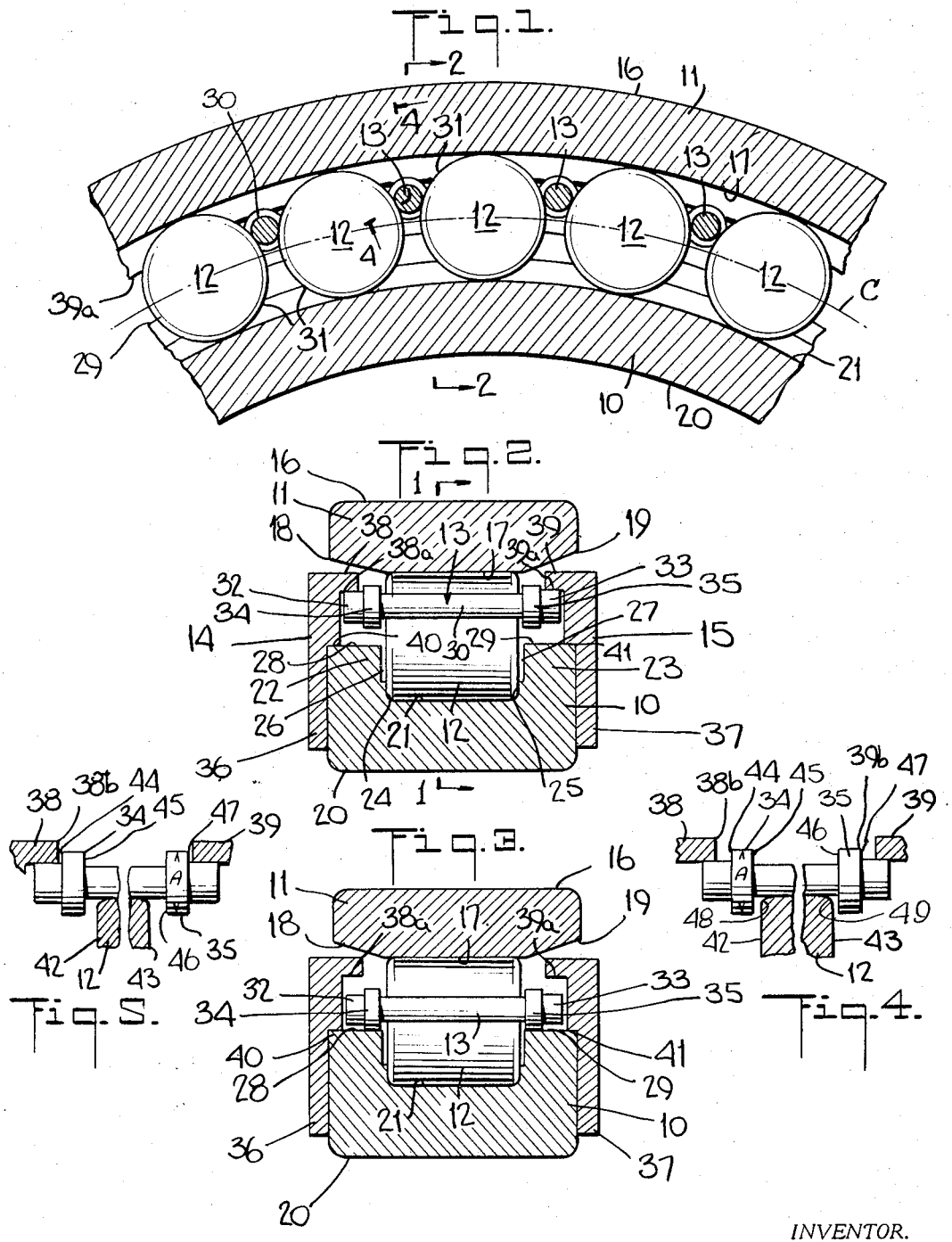

3,369,850
QUILL TYPE ROLLER BEARING
Arthur S. Irwin, Jamestown, N.Y., assignor to TRW Inc., Euclid, Ohio, a corporation of Ohio
Filed May 10, 1966, Ser. No. 549,002
9 Claims. (Cl. 308—206)

This invention relates to roller bearings and is directed particularly to roller bearings having quills and side plates for spacing the rollers.

Various types of means are utilized in roller bearings for spacing the rollers. The cage type of spacer or separator has the objection of producing a rubbing contact between the cage and the roller which creates wear and friction. It has long been recognized that the ideal spacers are small rollers or quills. The rolling contact between the spacing quills and rollers greatly reduces wear and eiminates it from the roller surfaces engaging the races. However, several difficulties have been encountered in entirely eliminating abrasive contact between the quills and the rollers. In previous quill type roller bearings the dumbbell shaped quills have intermediate cylindrical surfaces which engage the cylindrical surfaces of the rollers and enlarged cylindrical ends for engaging the races on the end or side plates. The radial inner sides of the quills engage the sides of the rollers for maintaining the quills in position. The quills have very small diameters in comparison to the diameters of the rollers. As a result, the radial sides of the enlarged portions instead of engaging the flat sides of the rollers engage the rounded corner of the rollers. This results in the quills digging into the rollers and causing abrasion and damage.

In order to avoid these difficulties it is desirable to provide radial surfaces on the quills and radial surfaces on the bearing which can contact to axially position the quills in relation to the rollers. In addition to avoiding abrasion, the axial guiding of the quills should also maintain the quill in parallel relation to the rollers. Skewing or cocking of the quills should be avoided and the twisting forces should be kept to a minimum.

In addition to providing means for axially positioning the quills, it is also desirable to provide means for maintaining the quills above the center of the rollers when the rollers are stationary. If the quills drop below the center, the quills then can become jammed.

An object of this invention is to provide a roller bearing with means for axially positioning the quills without undue wear on the rollers.

Another object of the invention is to provide adequate radial surfaces for axially positioning quills in roller bearings.

Another object of the invention is to prevent the quills in a quill type roller bearing from dropping below the center of the rollers.

Other and further objects and advantages will be apparent from the following description taken in connection with the drawings in which FIG. 1 is a fragmentary side view of the roller bearing taken along lines 1—1 of FIG. 2;

FIG. 2 is a sectional view taken along lines 2—2 of FIG. 1;

FIG. 3 is a sectional view taken along lines 2—2 of FIG. 1 with the bearing in the static state; and FIGS. 4 and 5 are fragmentary top views of the relationship of the quill, roller and side plates.

Referring to FIGS. 1 and 2, the roller bearing comprises an inner ring 10 and an outer ring 11 with cylindrical rollers 12 positioned therebetween. The rollers are spaced by quills 13 which are held on relative rotation of the rings by the side plates 14 and 15.

The outer ring 11 is of a conventional type having an outer surface 16 and an inwardly facing race 17 engaged by the rollers 12. Surfaces 18 and 19 are at an angle to the axis of the bearing to accommodate the side plates 14 and 15 and permit the flow of lubricant.

The ring 10 has a cylindrical mounting bore 20 and an outwardly facing race 21 for engagement by the rollers 12. The ring 10 has radially extending sides 22, 23 on opposite sides of the race 21 and rollers 12. Adjacent to the race 21 are surfaces 24 and 25 facing the ends of the rollers for guiding the rollers axially. The radially extending sides 22 and 23 have circumferentially extending spaces 26 and 27 to permit the flow of lubricant between the inner ring and the rollers. The sides 22 and 23 extend outwardly radially to position the outwardly facing surfaces 28 and 29 at a point described later herein.

The quills 13 are positioned between the rollers, as illustrated, and comprise main cylindrical surfaces 30 engaging the cylindrical surfaces 31 on the rollers 12. At the outer ends of the quills are cylindrical end surfaces 32, 33 with rims 34, 35 positioned between the cylindrical end surfaces and the main cylindrical surfaces. Side plates 36 and 37 are mounted on the inner ring 10 and have annular flanges 38 and 39 with race surfaces 38a, 39a, respectively, engaged by the quills 13 to position the main cylindrical surfaces and end surfaces in rolling contact with the rollers and side plates.

In the forming of the inner ring 10 the final machining of the surfaces of the ring is performed by finishing the outside diameter surfaces 28 and 29 to a given dimension. These surfaces function as the reference surfaces for the grinding of the cylindrical bore 20 and the cylindrical inner race 21.

The distance of the side plate race surfaces 38a and 39a is also critical in its relationship to the race 21. The critical positioning is attained by the precise machining of the locating diameters of the cylinder bore surfaces 40 and 41 on the side plates within narrow tolerances. These bore surfaces fit on the cylindrical surfaces 28 and 29, respectively, and thus function to precisely position the side plate race surfaces 38a, 39a in relation to the outer diameter surfaces 28 and 29. The surfaces 38a and 39a are machined in relation to the precisely dimensioned surfaces 40 and 41, and the race 21 is machined in relation to the surfaces 28 and 29. In each instance there is a single measurement to the reference surfaces 28, 29, thus greatly reducing variation. This permits a more precise and consistent relation to be maintained between the side plate races 38a and 39a and the inner ring race 21. The inner roller engaging surfaces 30 and the end surfaces 32, 33 are precisely machined to given diameters and for concentricity.

The quills also have a given dimensional relation to the radiuses of the side plate race surfaces 38a and 39a and the radius of the race 21. The radius of the end surface and the radius of the inner surface of the quill are proportional to the radius of the inwardly facing cylindrical race surfaces 38a, 39a and the radius of the inner ring race. When the dimensions conform to this relation, the end surfaces of the quill are in rolling contact with the side plate race surfaces and the inner surface of the quill is in rolling contact with the rollers 12.

The rollers 12 have flat radially extending side surfaces 42 and 43 and the flanges 38 and 39 have radial surfaces 38b and 39b facing the surfaces 42 and 43, respectively. As illustrated best in FIGS. 4 and 5 the surfaces 38b and 39b are axially spaced from the radial surfaces 42 and 43. The rims 34 and 35 fit into this space when the roller is running. The rims 34 and 35 have radial surfaces 44, 45 and 46, 47. The surfaces 45 and 46 face the surfaces 42 and 43, respectively, on the roller and surfaces 44 and 47 face the surfaces 38b and 39b on the side plates. The diameters A of the rims 34 and 35 are extended so that the surfaces 45 and 46 overlap with the surfaces 42 and 43 and extend substantially beyond the rounded corners 48 and 49 on the rollers. The axial dimensions may be adjusted so that the surfaces 45 and 46 engage the roller side surfaces 42 and 43 or the surfaces 44 and 47 engage the surfaces 38b and 39b, respectively, depending on whether the rollers are to function as the axial positioning means or the side plates. If the rims engage the rollers, there is a substantial radial and circumferentially extending surface contact between the quills and the rollers so that abrasion and excessive wear does not occur. Since the rollers are moving with the quills, any tendency for the quills to skew is instantly corrected by the engagement of the radial surfaces of the rims and rollers to hold or return the quill to a parallel relation with the roller.

It is preferable that the rollers are not engaged by a sliding contact. Therefore, the rims 34 and 35 may have the surfaces 44 and 47 engage the surfaces 38b and 39b for axially positioning the quill. In this instance the surfaces 45 and 46 do not engage the roller. The engagement of the surfaces 38b and 39b by the rims provides many small adjustments to maintain the alignment of the quills.

Thus in both instances the diameters of the rims 34 and 35 are unrestricted and the rims may be extended radially to provide proper and satisfactory areas for axially positioning the quills in relation to the rollers and for maintaining the parallel relationship.

In addition to providing proper surface contact, the rims also in cooperation with the surfaces 28 and 29 on the inner ring prevent the quill from dropping below the center line of the rollers 12. When the bearing is not rotating the quills drop out of contact with the side plates and if the rollers should separate the prior quills can drop below the pitch circle C. When the quills are in this position they become jammed below the center line and prevent the proper operation of the bearing. As pointed out above, the rims maintain the quills above the pitch circle and thus prevent the quills from becoming jammed.

Various modifications and changes may be made in the foregoing embodiment without departing from the invention as set forth in the appended claims.

I claim:

1. A roller bearing comprising inner and outer rings with rollers between said rings and having radially extending side surfaces, quills between said rollers having intermediate surfaces engaging said rollers and end surfaces having larger diameters than said intermediate surfaces, side plates mounted on opposite sides of said inner ring and having races for engagement by said end surfaces, said side plates having radially extending side surfaces facing the side surfaces of said rollers and axially spaced therefrom to form annular spaces therebetween and said quills having radially extending rims of larger diameter than said end surfaces and extending into said spaces for free setting of said rims at a diameter to provide proper side contacting areas for maintenance of the position of said quills.

2. A roller bearing comprising inner and outer rings with rollers between said rings and having radially extending side surfaces, quills between said rollers having intermediate surfaces engaging said rollers and end surfaces having larger diameters than said intermediate surfaces, side plates mounted on opposite sides of said inner ring and having races for engagement by said end surfaces, said side plates having radially extending side surfaces facing the side surfaces of said rollers and axially spaced therefrom to form annular spaces therebetween and said quills having radially extending rims of larger diameter than said end surfaces and extending into said spaces for the free setting of the diameter of said rims to provide radially extending side surfaces on said rims for proper engagement of said radially extending side plate surfaces with minimum wear and abrasion to axially position and to prevent skewing of said quills in relation to said rollers.

3. A roller bearing comprising inner and outer rings with rollers between said rings and having radially extending side surfaces, quills between said rollers having intermediate surfaces engaging said rollers and end surfaces having larger diameters than said intermediate surfaces, side plates mounted on opposite sides of said inner ring and having races for engagement by said end surfaces, said side plates having radially extending side surfaces facing the side surfaces of said rollers and axially spaced therefrom to form annular spaces therebetween and said quills having radially extending rims of larger diameter than said end surfaces and extending into said spaces for the free setting of the diameter of said rims to provide radially extending side surfaces on said rims for engaging said roller radially extending side surfaces with a minimum of wear and abrasion to axially position and prevent skewing of said quills.

4. A roller bearing comprising inner and outer cylindrical rings, cylindrical rollers between said rings and in engagement therewith and having flat radially extending side surfaces, quills positioned between said rollers and having intermediate cylindrical surfaces for engaging said rollers and cylindrical end surfaces having a larger diameter than the intermediate cylindrical surfaces, side plates mounted on opposite sides of said inner ring and having inwardly extending flanges with annular cylindrical races for engagement by said cylindrical end surfaces and having radially extending surfaces facing said rollers and spaced from said roller side surfaces to form with said side plates annular passages between said side plates and said rollers, cylindrical rims on said quills between said respective end surfaces and said intermediate surfaces and having a diameter larger than said end surfaces freely settable in said annular spaces to provide radially extending side surfaces for engaging said radially extending side plate surfaces with a minimum of wear and abrasion to axially position and prevent skewing of said quills.

5. A roller bearing as set forth in claim 1 wherein said end surfaces of said quills and said inner ring have diameters to prevent said quills from dropping below the pitch circle through the diameters of said rollers by the engagement of said inner ring and said end surfaces.

6. A roller bearing as set forth in claim 2 wherein said end surfaces of said quills and said inner ring have diameters to prevent said quills from dropping below the pitch circle through the diameters of said rollers by the engagement of said inner ring and said end surfaces.

7. A roller bearing as set forth in claim 3 wherein said end surfaces of said quills and said inner ring have diameters to prevent said quills from dropping below the pitch circle through the diameters of said rollers by the engagement of said inner ring and said end surfaces.

8. A roller bearing as set forth in claim 4 wherein said end surfaces of said quills and said inner ring have diameters to prevent said quills from dropping below the pitch circle through the diameters of said rollers by the engagement of said inner ring and said end surfaces.

9. A roller bearing comprising inner and outer cylindrical rings having facing races, cylindrical rollers between said rings dynamically engaging said races, quills positioned between said rollers to space said rollers, said quills having intermediate cylindrical surfaces engaging said rollers over the length thereof and cylindrical surfaces on opposite sides of said rollers and having diameters larger than said intermediate cylindrical surfaces, said inner rings having annular lands on opposite sides of said inner race extending radially outward from said inner race, side plates mounted on said lands to extend radially on opposite sides of said rollers and having annular cylindrical races engaged by said end surfaces on relative rotation of said rings and having radially extending surfaces facing said rollers and spaced from said roller side surfaces to form with said side plates annular passages between said side plates and rollers, cylindrical rims on said quills between said respective end surfaces and said intermediate surfaces and positioned in said passages between said side plates and rollers for setting the diameter of said rims larger than said end surfaces to values for engaging said radially extending side plate surfaces to prevent said quills from dropping below the circle through the diameters of said rollers by said rims engaging said lands.

References Cited

FOREIGN PATENTS 945,251   12/1963   Great Britain.

MARTIN P. SCHWADRON, *Primary Examiner.*

FRANK SUSKO, *Examiner.*